United States Patent
Golichowski et al.

[11] Patent Number: 6,024,376
[45] Date of Patent: *Feb. 15, 2000

[54] PLATFORM TRUCK WITH MULTI-POSITIONABLE HANDLE

[75] Inventors: Gary D. Golichowski; Donald C. Presnell, both of Stephens City, Va.

[73] Assignee: Rubbermaid Commercial Products Inc., Winchester, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/856,296

[22] Filed: May 14, 1997

[51] Int. Cl.$^7$ ........................................ B62B 3/00
[52] U.S. Cl. .................... 280/655.1; 280/79.11; 280/655; 16/35 R; 16/115
[58] Field of Search ................ 280/655.1, 655, 280/654, 651, 87.01, 47.34, 47.35, 47.29, 47.315, 47.371, 47.36, 79.11; 16/38, 35 R, 19, 115

[56] References Cited

U.S. PATENT DOCUMENTS

| | | | |
|---|---|---|---|
| 3,879,053 | 4/1975 | Chvala | 280/79.1 |
| 3,884,493 | 5/1975 | Weir et al. | 16/35 R |
| 3,902,576 | 9/1975 | Pitan et al. | 16/35 R |
| 4,203,609 | 5/1980 | Mitchell et al. | 280/47.11 |
| 4,274,644 | 6/1981 | Taylor | 280/654 |
| 4,561,239 | 12/1985 | Cook | 280/47.36 |
| 5,114,164 | 5/1992 | Bothwell et al. | 280/655 |
| 5,299,816 | 4/1994 | Vom Braucke et al. | 280/655.1 |
| 5,538,267 | 7/1996 | Pasin et al. | 280/87.01 |
| 5,556,118 | 9/1996 | Kern et al. | 280/47.34 |
| 5,816,604 | 10/1998 | Hsieh et al. | 280/655.1 |
| 5,819,514 | 10/1998 | Firdaus | 16/35 R |
| 5,842,329 | 12/1998 | Carter | 280/47.371 |
| 5,911,424 | 6/1999 | Rovinsky | 280/79.11 |

OTHER PUBLICATIONS

Rubbermaid Advertisement "Floor Equipment—Tilt Trucks—Platform Trucks", 1 page (undated).

*Primary Examiner*—Lanna Mai
*Assistant Examiner*—Lynda Jasmin
*Attorney, Agent, or Firm*—Renner, Kenner, Greive, Bobak, Taylor & Weber

[57] ABSTRACT

A platform truck (10) for transporting items includes a base member (11) having a top surface (13) to received the items thereon. A handle assembly (12) is pivotally carried by the base member (11) and is thereby positionable in a generally upright position for pushing the base member (11), a generally outward position for pulling the base member (11), and a generally horizontal position generally flush with the top surface (13) of the base member (11). Opposed side wall assemblies (14) extend generally vertically downwardly from the top surface (13) of the base member (11) and have opposed depressions (22) therein. Side wall assemblies also carry a latch assembly (45). When the handle assembly (12) is in the generally horizontal position, latch assembly (45) holds arms (24) of the handle assembly (12) which can be grasped at the location of at least one of the depressions (22) for carrying the platform truck (10). The base member (11) is supported by a plurality of casters (48, 49), the front casters (49) being carried by a caster support system (50) which permits the front casters (49) to be mounted to the base member (11) for either unidirectional movement or fully swivelable movement of the front casters (49).

26 Claims, 9 Drawing Sheets

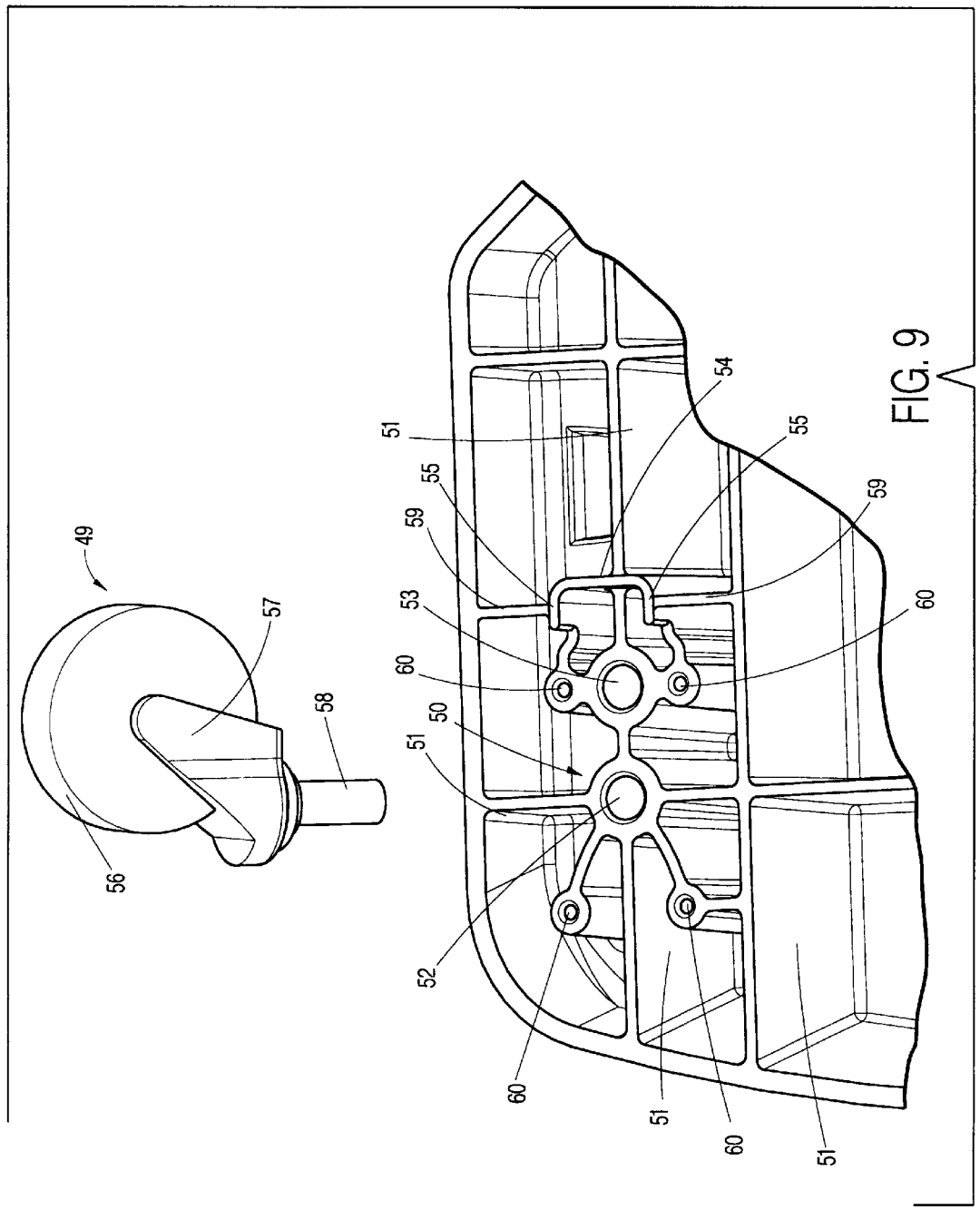

PLATFORM TRUCK WITH MULTI-POSITIONABLE HANDLE

TECHNICAL FIELD

The present invention relates to a platform truck utilized to transport items at a home, office, factory, or the like. More particularly, this invention relates to such a platform truck which is provided with a multi-positionable handle for selectively pulling, pushing, and storing the platform truck as well as utilizing the same as a dolly. In addition, the platform truck is provided with a unique caster mounting system which selectively permits unidirectional or multi-directional steering thereof.

BACKGROUND ART

Platform trucks which usually include a generally rectangular, flat, material-supporting surface supported by casters and a handle for manipulating the truck are well known and have remained essentially unchanged for many years. In most such platform trucks, the handles are permanently positioned in an upright or generally vertical orientation. While such configuration allows the user to move the truck, it has been found that it causes several problems. First, if the user is pushing the truck, to avoid having his feet hit the back of the truck, the user must stand a distance behind it resulting in extra effort and potential back strain while reaching for the handle when pushing the truck. Second, if pulling the truck, the handle orientation of the prior art often causes the heels of the user to be clipped by the body of the truck. Finally, these prior art trucks cannot be readily stored in a compact environment when not in use primarily because of the upright handle.

While some efforts have been made to provide an adjustable handle for platform trucks, particularly in those made of metal, such have proved to be cumbersome and expensive to manufacture, and require several uniquely configured and awkwardly positioned components which could add to the potential for injury or irritation to the feet of the user.

In an attempt to solve the storage problem, some platform trucks have been provided with removable handles. Such, however, not only requires an extra mechanical step for the user to disassemble and later assemble the unit, but also requires the ultimate storage of two items. Other solutions to the storage problem involve the folding of the handle down onto the platform. However, this not only renders the unit thicker, taking up more storage space, but also it makes the unit difficult to carry to its storage location with only under-arm carrying being available. Moreover, in the folded position, the handle interferes with the potential to place items on the platform and utilize the truck as a handless dolly.

Another problem with conventional platform trucks relates to the manner in which the casters, which render the trucks mobile, are mounted to the support surface. Usually the rear casters, that is, those located adjacent to the handle, are fully rotatable or swivelable, and the front casters are either mounted to likewise be fully rotatable or to be unidirectional. Such systems do not allow the user the option of having either rotatable or unidirectional front casters, the latter being desirable for providing greater steering stability when encountering heavier loads and the former being preferable for lighter loads.

Thus, the need exists for a platform truck with a handle that can be readily located in a variety of positions to facilitate pushing, pulling, storing and carrying the platform truck, and optional caster mounting systems for selective universal maneuverability of the platform truck.

DISCLOSURE OF THE INVENTION

It is thus an object of the present invention to provide a platform truck with a multi-positionable handle.

It is another object of the present invention to provide a platform truck, as above, with a handle that is selectively pivotal to a proper pulling position, pushing position, and storage position.

It is a further object of the present invention to provide a platform truck, as above, in which the handle is generally flush with the platform surface when the handle is in the storing position, enabling the platform truck to be used as a dolly.

It is a still further object of the present invention to provide a platform truck, as above, wherein the handle may be temporarily and automatically latched in the storing position.

It is an additional object of the present invention to provide a platform truck, as above, which may be readily carried when the handle is in the storing position.

It is yet a further object of the present invention to provide a platform truck, as above, which provides the user with the option of mounting the front set of casters for only unidirectional movement or for fully rotational movement of the platform truck.

It is yet another object of the present invention to provide a platform truck, as above, which is inexpensive to manufacture, easy to assemble, and easy to manipulate the handle to any of its multiple positions without the need for any special tools.

These and other objects of the present invention, which will become apparent from the description to follow, are accomplished by the improvements hereinafter described and claimed.

In general, a platform truck for transporting items made in accordance with one aspect of the present invention includes a base member having a top surface to receive the items thereon. A handle assembly is pivotally carried by the base member and is thereby positionable in a generally upright position for pushing the base member, a generally outward position for pulling the base member, and a generally horizontal position generally flush with the top surface of the base member.

In accordance with another aspect of the present invention, the base member also includes generally vertical opposed side walls extending downwardly from its top surface. The side walls have opposed depressions therein. The handle is carried by the base member and is pivotal from a generally upright position to a position generally adjacent to the side walls so that the platform truck may be carried by grasping the handle at the location of at least one of the depressions in the side walls.

In accordance with yet another aspect of the present invention, a plurality of casters are carried by the bottom of the base member by a caster support system. The caster support system permits selected of the casters to be mounted to the base member for either unidirectional movement or fully swivelable movement of the selected of the casters.

A preferred exemplary platform truck incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 9 is an exploded, fragmented view of a portion of the bottom of the platform truck showing the caster mounting system of the present invention.

PREFERRED EMBODIMENT FOR CARRYING OUT THE INVENTION

Figure 1:
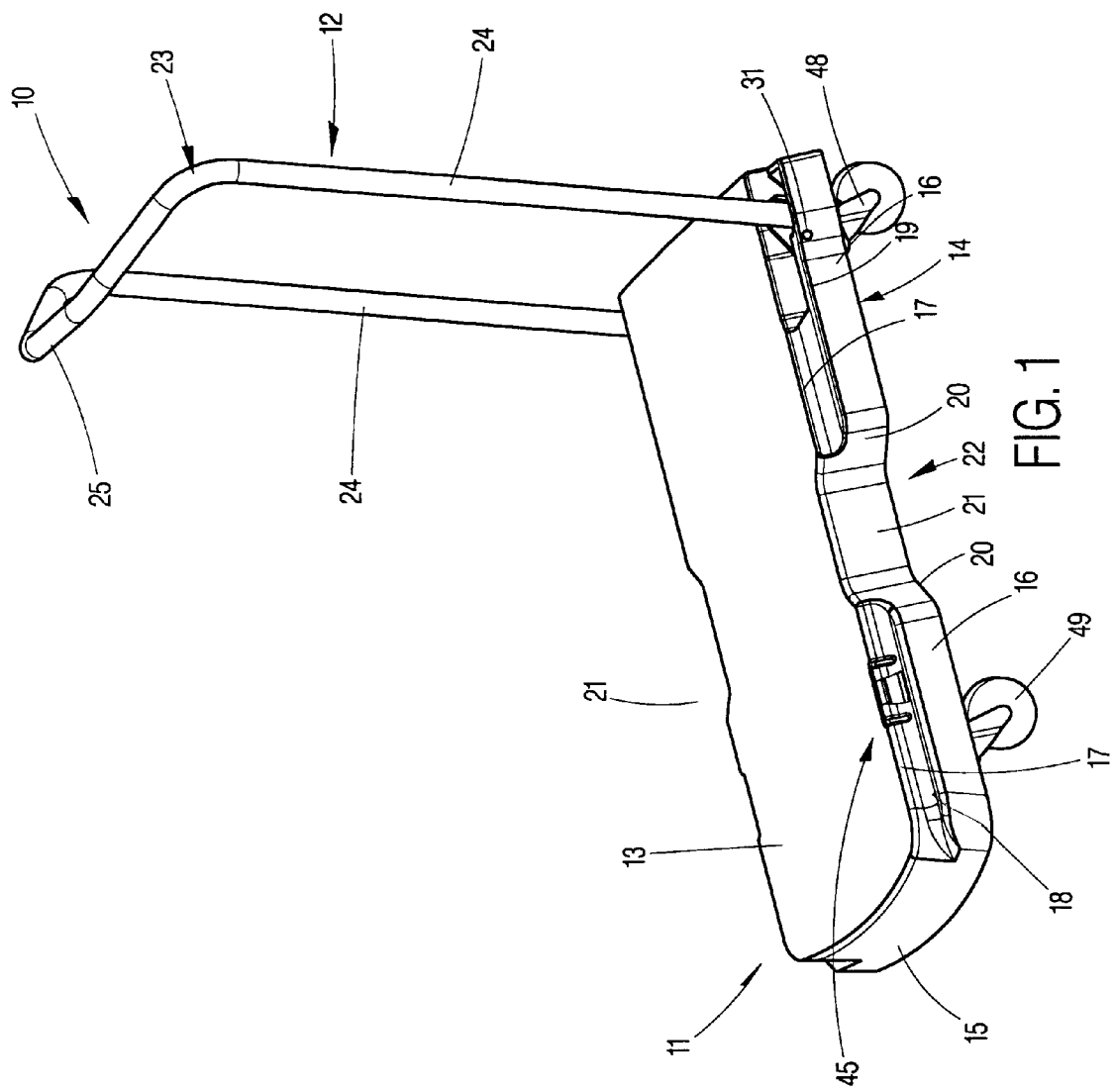
FIG. 1 is a perspective view of a platform truck made in accordance with the concepts of the present invention and showing the handle assembly in its generally upright position which is especially adapted for pushing the platform truck.

A platform truck made in accordance with the concepts of the present invention is indicated generally by the numeral 10 and includes a base member generally indicated by the numeral 11 and a handle assembly generally indicated by the numeral 12. Base member 11 may be fabricated from any suitable sturdy plastic material such as polyethylene structural foam, and handle assembly 12 is preferably metallic in nature.

Base member 11 includes an upper, planar, generally horizontal top surface 13 to receive items thereon to be transported by platform truck 10. A side wall assembly, generally indicated by the numeral 14, extends downwardly from each side of top surface 13. Side wall assemblies 14 are joined by a front nose 15 which extends downwardly from the front of top surface 13. Side wall assemblies 14 are identical and include an outer side wall 16 and an inner side wall 17 which are laterally spaced from each other at the front and rear of base member 11 to form a front channel 18 and a rear channel 19 therebetween. Outer side wall 16 is positioned lower than inner side wall 17, and front channel 18 terminates at its rear end and rear channel 19 terminates at its front end by walls 20 which extend inwardly and upwardly from outer side wall 16 to inner side wall 17. Each inner side wall 17 is recessed or notched inwardly, as at notched area 21, to form opposed depressions, generally indicated by the numeral 22, in the side wall assemblies 14, which depressions are located generally medially of base member 11. Depressions 22 are thus defined by walls 20 and recessed or notched area 21.

Handle assembly 12 includes a U-shaped handle, generally indicated by the numeral 23, having spaced arms 24 interconnected at one end by a gripping member 25. Although it is not critical, gripping member 25 is shown as being inwardly offset from the plane of arms 24 which are spaced a distance slightly greater than the space between inner side walls 17 and slightly less than the space between outer side walls 18.

Figure 5:
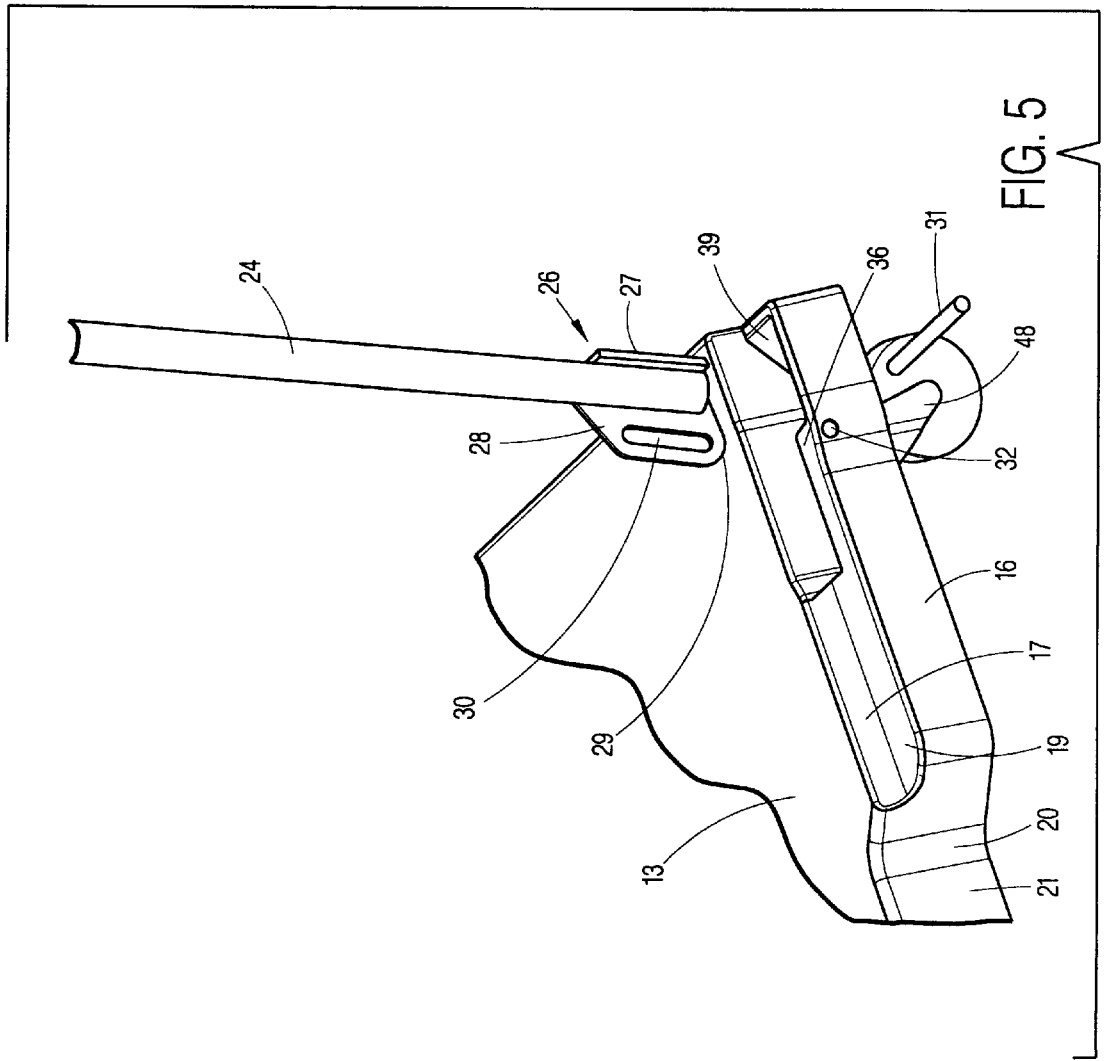
FIG. 5 is an exploded, fragmented perspective view of the platform truck depicting the configuration of the handle assembly and the manner in which it is assembled to the base member.

As best shown in FIG. 5, the bottom of each handle arm 24 is provided with a bracket, generally indicated by the numeral 26, which may be made of a metallic material and which is affixed to each arm 24 in any conventional manner as would be well known in the art, such as by welding. Bracket 26 is L-shaped in configuration having a rear branch 27 and a side branch 28 with arm 24 being positioned therebetween. Branch 27 preferably extends downwardly only to the bottom of arm 24 and may be used not only to provide the connecting area between bracket 26 and arm 24, but also to evenly distribute the load when pushing or pulling platform truck 10. Branch 28, on the other hand, has an arcuate lug 29 which extends below arm 24. Branch 28 extends outwardly from arm 24 and is provided with an elongate slot 30 therein which extends generally upwardly from lug 29.

Figure 4:
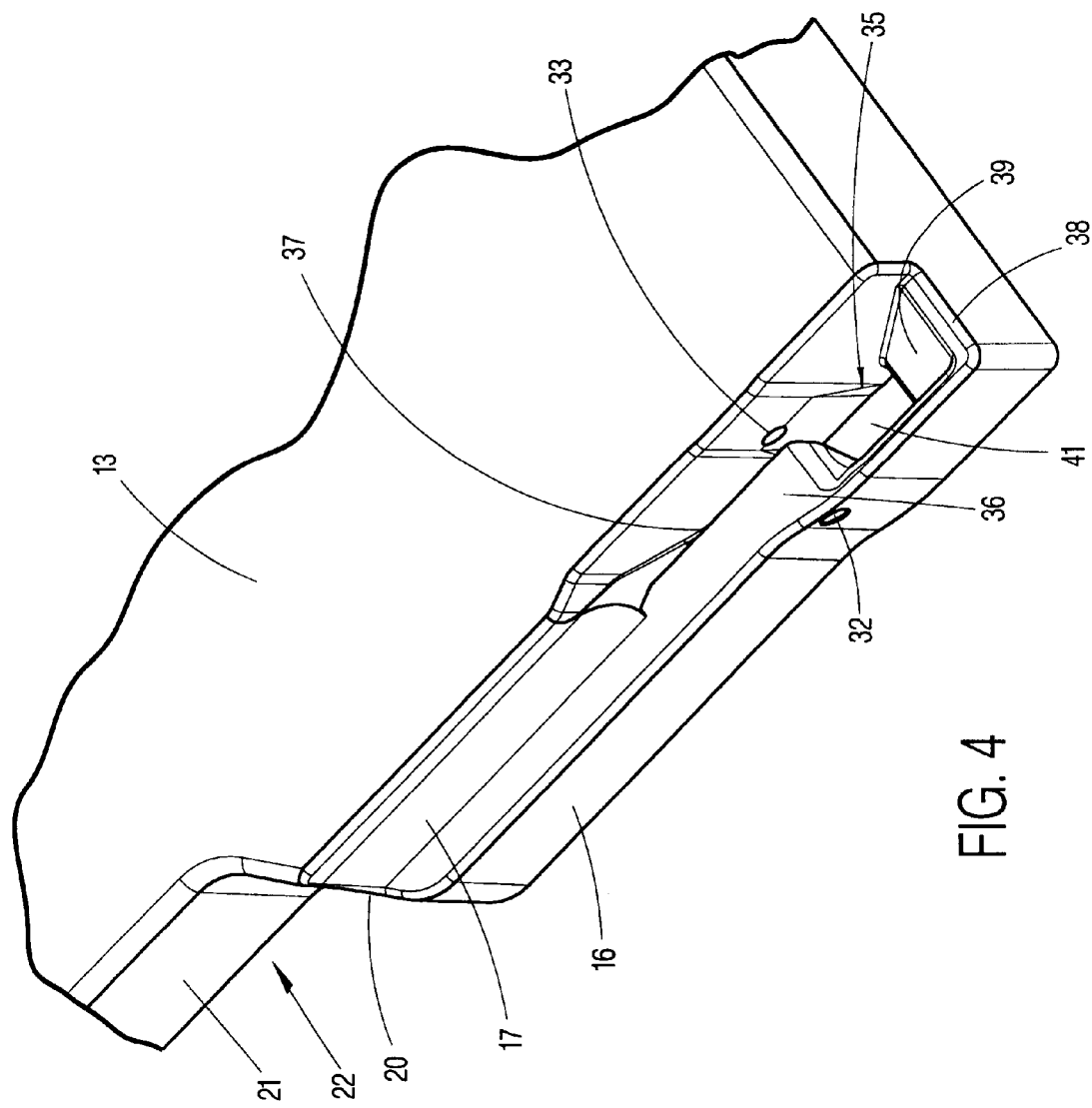
FIG. 4 is a fragmented perspective view of the platform truck showing the area at which the handle assembly is pivotally attached.

Handle assembly 12 may be readily pivotally attached to base member 11 by means of a steel pin 31 which is adapted to pass through an aperture 32 in outer side wall 16, slot 30 of bracket 26, and an aperture 33 (FIG. 4) in inner side wall 17, and be held in place by any suitable means as would be well known in the art. As such, handle assembly 12 is rotatable on pin 31 relative to base member 11, and is designed to be located at one of three positions, as will hereinafter be described.

To assist in positioning handle assembly 12 relative to base number 11, a pocket, generally indicated by the numeral 35, is formed near the rear end of each side of base member 11. Pocket 35 is defined on one side by inner side wall 17, and on the other side by outer side wall 16 which is shown to have a thickened portion 36 which serves to laterally confine branch 28 of bracket 26. Pocket 35 extends forwardly from the area of pin 31, to define a well 37 to receive bracket 26 when handle assembly 12 is in the folded, FIG. 3, position. The rear of pocket 35 is defined by a bearing block 38 having an upper bevelled surface 39 which terminates inwardly at a generally vertical surface 40 which extends to the bottom of pocket 35. At one location in pocket 35, an aperture 41 is provided at the bottom thereof through which the bottom of handle assembly 12 extends when in the generally upright position as shown in FIG. 6.

Figure 6:
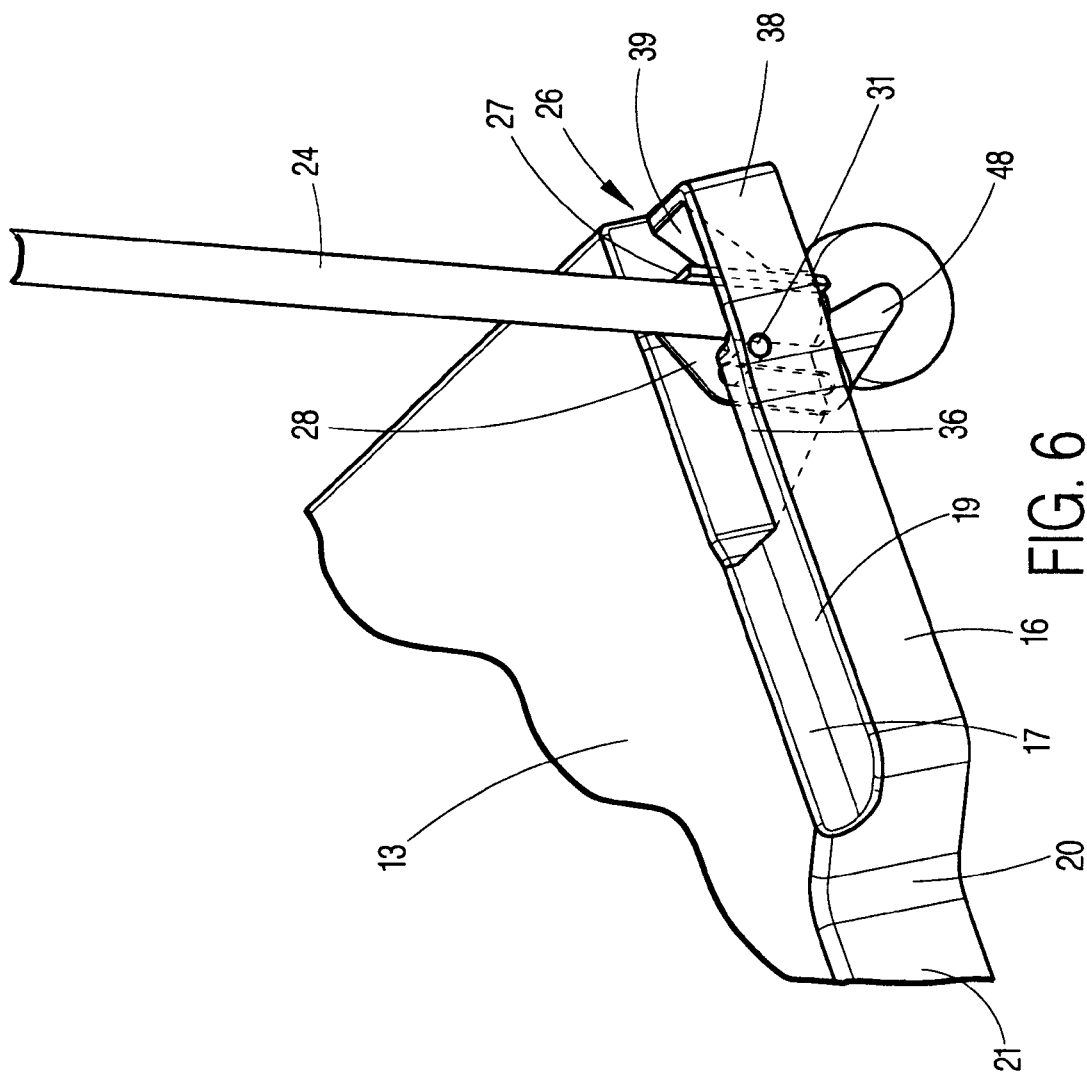
FIG. 6 is a fragmented perspective view of the platform truck showing the position of the attachment of the handle assembly when in the generally upright position of FIG. 1.

The configuration of pocket 35 and the pin connection between handle assembly 12 and base member 11, as previously described, selectively supports handle assembly 12 in one of three positions, one position being shown in FIG. 1 and FIG. 6 whereby platform truck 10 is adapted to be pushed by the user. In this position, the bottom of handle assembly 12 extends through pocket aperture 41 and pin 31 is positioned at the top of slot 30. While handle assembly 12 is generally upright in this position, it is preferred that it extend rearwardly at an angle of about fifteen degrees so that the user can readily push platform truck 10 without damage to his feet and without undue back strain. In this position, by pushing gripping member 25 of handle assembly 12, the force of such is absorbed by both pin 31 at the front of handle assembly 12 and to some extent by vertical surface 40 of bearing block 38 behind handle assembly 12.

Figure 2:
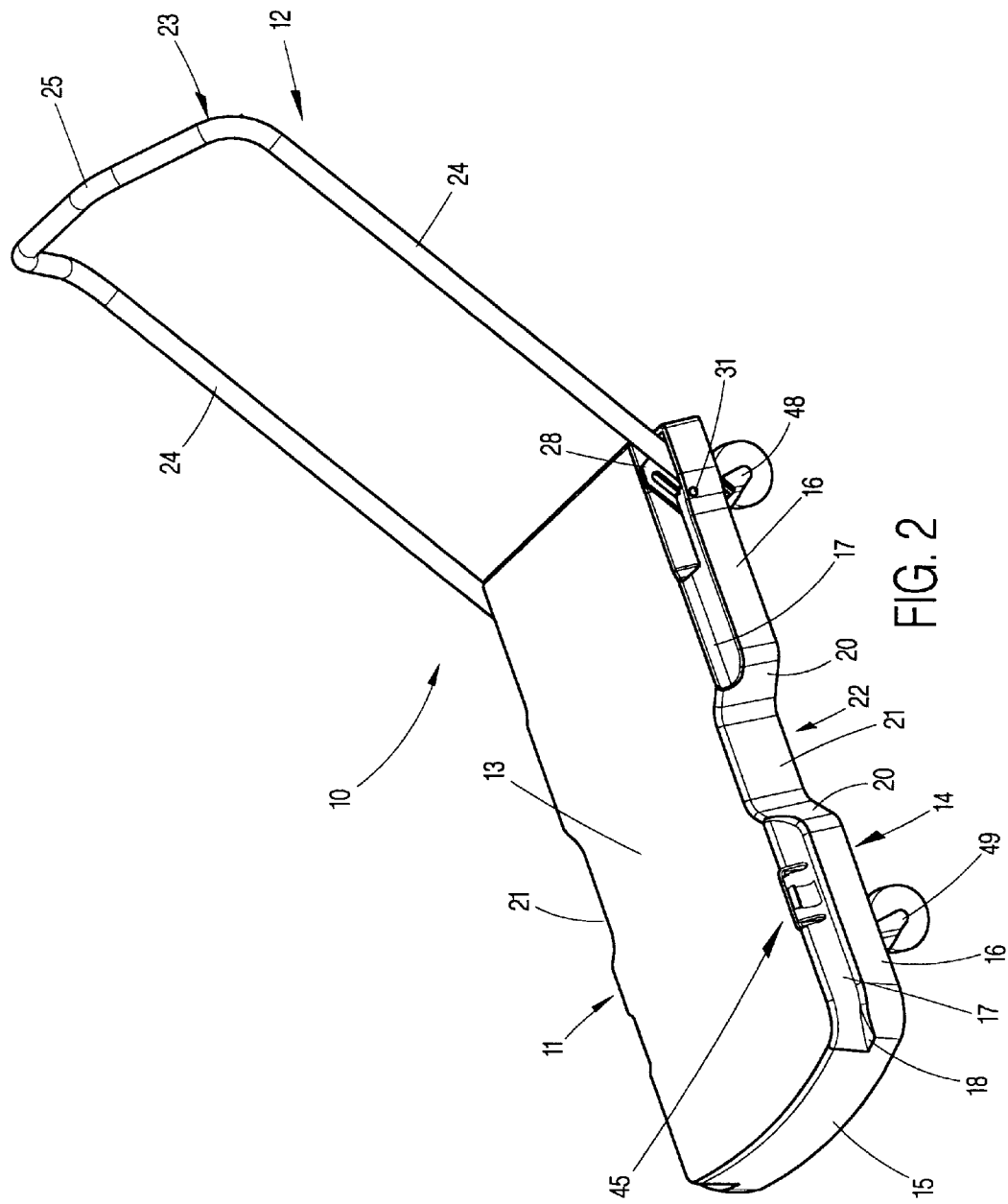
FIG. 2 is a perspective view of the platform truck with the handle assembly having been pivoted to its outward position which is especially adapted for pulling the platform truck.
Figure 7:
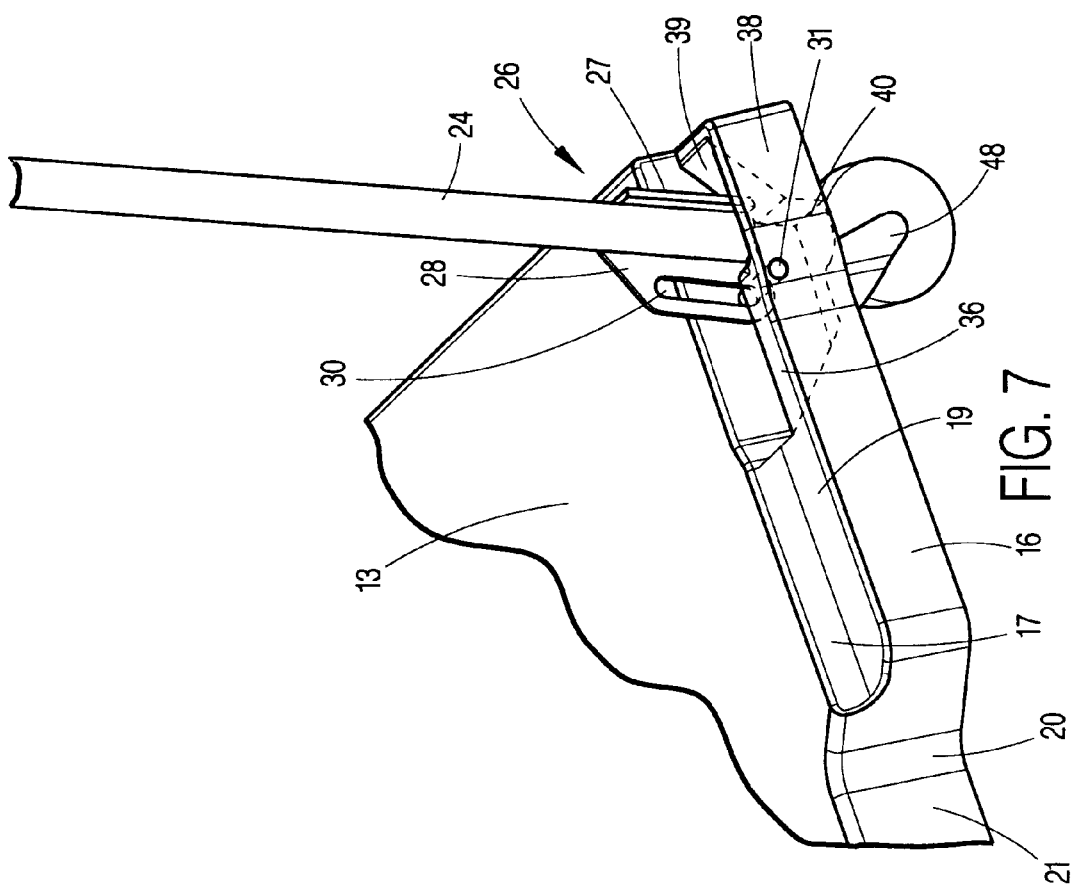
FIG. 7 is a fragmented perspective view of the platform truck showing the handle assembly having been moved from the position shown in FIG. 6 to a disengaged position so that it can be rotated to the outward position shown in FIG. 2.

If it is desired to pull platform truck 10, handle assembly 12 is merely lifted from the FIG. 6 to the FIG. 7 position which locates pin 31 at the bottom of slot 30. Because lug 29 is below the bottom of handle arm 24, disengagement of handle assembly 12 from pocket aperture 41 is permitted. At that point, handle assembly 12 may be rotated rearwardly on pin 31 to the FIG. 2 position where bracket branch 27 and the lower portion of handle area 24 rest against bevelled surface 39 of bearing block 38. As such, handle assembly 12 extends substantially rearwardly of body member 11 and platform truck 10 can readily be pulled by the user without the fear of clipping his heels. Such pulling force is absorbed by pin 31 and to some extent by bevelled surface 39 of bearing block 38.

Figure 3:
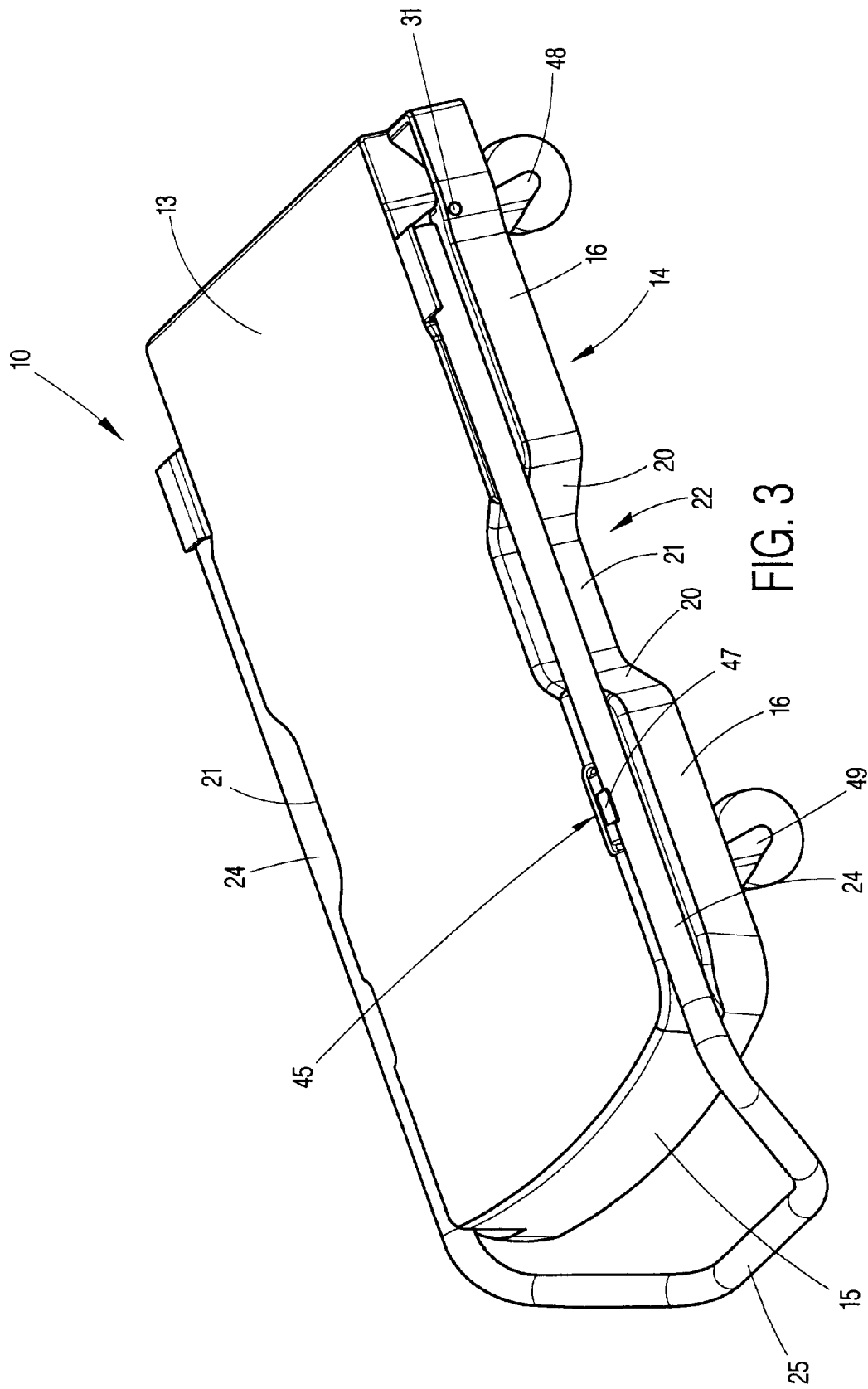
FIG. 3 is a perspective view of the platform truck with the handle assembly having been pivoted to and locked at a generally horizontal position for facile storage and carrying of the platform truck or use thereof as a dolly.
Figure 8:
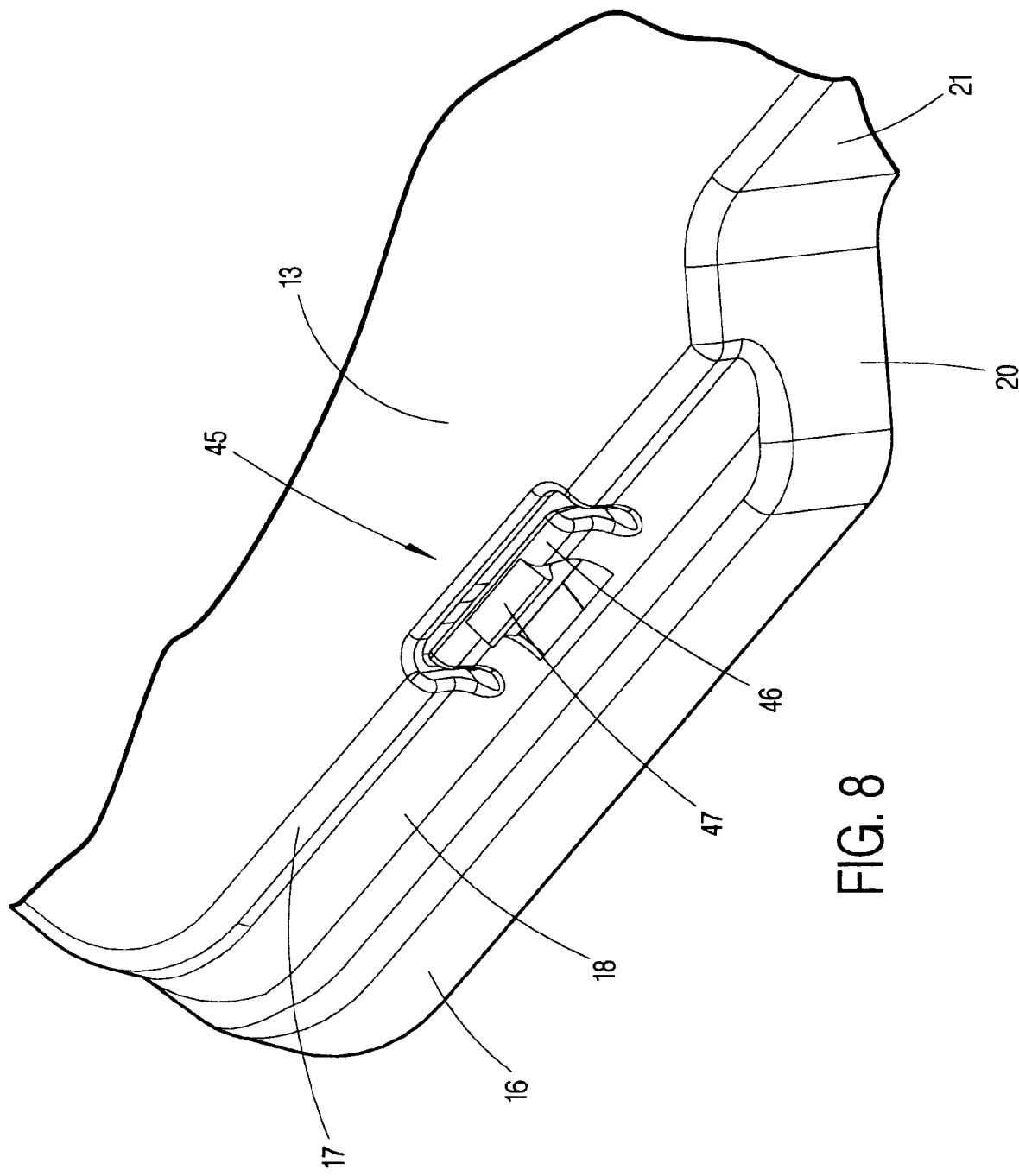
FIG. 8 is a fragmented perspective view of the platform truck showing the latch area thereof where the handle assembly may be locked in the position shown in FIG. 3.

When handle assembly 12 is in the released, FIG. 7, position, it may also be rotated forwardly on pin 31 to a horizontal position, as shown in FIG. 3, such that arms 24 are positioned generally parallel and adjacent to side wall assemblies 14. As handle assembly 12 is being rotated, branch 28 of bracket 26 is received in well 37 of pocket 35 and arms 24 pass over and are locked by a latch assembly generally indicated by the numeral 45 preferably formed on the inner side wall 17 of each side wall assembly 14, but which could be provided on outer side wall 16. As best shown in FIG. 8, latch assemblies 45 are formed by a generally flexible U-shaped cutout 46 in each inner side wall 17. Cutout 46 carries a lock barb 47 which is positioned to interfere with or otherwise be in the path of the movement of handle arms 24. As such, when rotating handle assembly 12 toward the FIG. 3 position, arms 24 will engage the top of barb 47 causing cutout 46 to flex generally inwardly and downwardly. Continued movement of handle assembly 12 past latch assembly 45 will cause barb 47 to snap back over arms 24 with the underside of barbs 47 thereby engaging arms 24 to hold handle assembly 12 in the FIG. 3 position. As shown, arms 24 rest on the top of walls 20 and in front channel 18 and rear channel 19, and are thereby positioned either generally flush with or slightly below top surface 13 of base member 11.

Because of this arrangement, when in the FIG. 3 position, platform truck 10 may readily be used as a handleless dolly because handle assembly 12 does not interfere with the placement of items on base member 11. Also, when in this position, because of its low profile, platform truck 10 may readily be stored under a table or the like or could be hung on a wall from handle gripping member 25. Moreover, in the FIG. 3 position, it should be noted that arms 24 span the area of base member depressions 22. As such, one or both arms 24 can be grasped at the area of depressions 22 and platform truck 10 can be carried in a "luggage" fashion.

In order to render the platform truck 10 mobile, it is provided with a pair of rear caster assemblies 48 and a pair of front caster assemblies 49. For ease of steering, rear caster assemblies 48 are usually preferably mounted to be fully swivelable, that is, over a range of 360 degrees. However, in use it is often desirable to have the front caster assemblies 49 either be fully swivelable, like rear caster assemblies 48, or to be oriented for rotation in the forward direction only, as might be preferred when carrying a particularly heavy load on platform truck 10.

Thus, in accordance with another aspect of the present invention, platform truck 10 is provided with two caster support systems, generally indicated by the numeral 50, (one shown in FIG. 9) which allow the user to select either unidirectional mounting of front caster assemblies 49 or universal directional mounting thereof. As shown in FIG. 9, the bottom of base member 11 is provided with relatively conventional honeycomb-like ribs 51 which provide structural load bearing support for base member 11. Ribs 51 also carry caster support system 50. Specifically, a first caster socket 52 is formed in one rib 51, and a second caster socket 53 is formed longitudinally adjacent to first caster socket 52. A U-shaped caster restraint 54, having opposed arms 55, is formed adjacent to second caster socket 53, and extends outwardly from the lower edges of ribs 51.

A front caster assembly 49, as shown in FIG. 9, includes a roller wheel 56 rotatably mounted in a caster frame 57, and a stem 58 which rotationally carries frame 57, all of which are conventional in the caster art. If the user wishes to provide platform truck 10 with fully swivelable front caster assemblies, the user merely installs the stem 58 of each front caster assembly 49 into first caster socket 52. If, on the other hand, unidirectional movement of front caster assemblies 49 is desired, stem 58 of each front caster assembly 49 is inserted into second caster socket 53. In so doing, caster frame 57 is positioned within restraint 54 and opposed arms 55 thereof prevent the caster frame 57 from rotating on stem 58. If desired, a pair of additional ribs 59 may be formed in the bottom of base member 11 to provide additional support for opposed arms 55.

As also is shown in FIG. 9, platform truck 10 is also provided with yet a third caster mounting feature. To this end, four spaced sockets 60 are formed at the bottom of base member 11 and supported by ribs 51. If extremely heavy loads are anticipated, a plate (not shown) carrying a caster may be affixed to base member 11 by inserting fasteners into sockets 60.

It should thus be appreciated that a platform truck made in accordance with the concepts of the present invention, as described hereinabove, provides a handle with multi-positionable capabilities and a unique caster mounting system such that the objects of the invention are carried out to the improvement of the platform truck art.

What is claimed is:

1. A platform truck for transporting items comprising a base member having a top surface to receive items thereon, opposed pockets formed in said base member, a handle assembly having opposed arms with lower ends pivotally carried within said pockets and movable between a lower position and an upper position within said pockets, said handle assembly being fixedly positionable in selected multiple positions including a first generally upright position for pushing said base member when said lower ends are in said lower position in said pockets, said arms being selectively pivoted to a second generally outward position for pulling said base member, and a third generally horizontal position generally flush with said top surface of said base member when said lower ends are in said upper position in said pockets.

2. A platform truck according to claim 1 wherein said base member includes generally vertical opposed side walls extending downwardly from said top surface, and opposed depressions in said side walls such that when said handle assembly is in said generally horizontal position the platform truck may be carried by grasping said handle assembly at the location of at least one of said depressions in said side walls.

3. A platform truck according to claim 1 further comprising a plurality of casters, and a caster support system formed on the bottom of said base member, said caster support system permitting selected one of said casters to be selectively mounted to said base member for unidirectional movement or fully swivelable movement of said selected one of said casters.

4. A platform truck according to claim 1 wherein said base member includes side wall assemblies and a latch member formed in each said side wall assembly, each said latch member holding said handle assembly in said generally horizontal position.

5. A platform truck according to claim 4 wherein each said latch member includes a lock barb positioned to interfere with the pivotal movement of said handle assembly such that said handle assembly causes each said latch member to flex as said handle assembly passes by each said latch member, each said barb engaging said handle assembly after said handle assembly has passed by each said latch member to said generally horizontal position.

6. A platform truck according to claim 1 wherein said handle assembly includes a grip member between said arms.

7. A platform truck according to claim 1 wherein said base member includes side wall assemblies, said pockets being formed in each of said side wall assemblies.

8. A platform truck according to claim 7 wherein said handle assembly includes a bracket attached to the bottom of each said arm, one said bracket being received in one said pocket.

9. A platform truck for transporting items comprising a base member having a top surface to receive items thereon, said base member including side wall assemblies and a pocket formed in each of said side wall assemblies, a handle assembly pivotally carried by said base member, said handle assembly including opposed, spaced arms and a bracket attached to the bottom of each said arm, one said bracket being received in one said pocket, each said bracket including a branch extending outwardly of each said arm and below each said arm, and an elongate slot formed in said branch, said handle assembly being thereby positionable in a generally upright position for pushing said base member, a generally outward position for pulling said base member, or a generally horizontal position generally flush with said top surface of said base member.

10. A platform truck according to claim 9 wherein each said pocket includes a well, one said branch being positioned in one said well when said handle assembly is in said generally horizontal position.

11. A platform truck according to claim 9 further comprising a pin extending through each said side wall assembly and through each said slot, said handle assembly being pivotal on said pins.

12. A platform truck according to claim 11 further comprising an aperture at the bottom of each said pocket, one said arm being received through one said aperture when said handle assembly is in said generally upright position, each said pin being located near the top of each said slot.

13. A platform truck according to claim 11 further comprising a bearing block positioned adjacent to each said pocket, each said bearing block having a generally vertical surface and a bevelled surface.

14. A platform truck according to claim 13 wherein a said arm rests against one said generally vertical surface when said handle assembly is in said generally upright position.

15. A platform truck according to claim 13 wherein one said arm rests against one said bevelled surface when said handle assembly is in said generally outward position, each said pin being located at the bottom of each said slot.

16. A platform truck for transporting items comprising a base member having a top surface to receive items thereon and generally vertical opposed side wall assemblies extending downwardly from said top surface, opposed depressions in said side wall assemblies, a handle carried by said base member and being pivotal from a generally upright position to a position generally adjacent to said side wall assemblies so that the platform truck may be carried by grasping said handle at the location of at least one of said depressions in said side wall assemblies.

17. A platform truck according to claim 16 further comprising a plurality of casters, and a caster support system formed on the bottom of said base member, said caster support system permitting selected of said casters to be selectively mounted to said base member for unidirectional movement or fully swivelable movement of said selected of said casters.

18. A platform truck according to claim 16 further comprising a latch member formed in each said side wall assembly to maintain said handle in said position generally parallel to said side wall assemblies.

19. A platform truck according to claim 18 wherein each said latch member includes a lock barb positioned to interfere with the pivotal movement of said handle such that said handle causes each said latch member to flex as said handle passes by each said latch member, said bars engaging said handle after said handle has passed by each said latch member to said position generally parallel to said side wall assemblies.

20. A platform truck according to claim 16 wherein said each said side wall assembly includes an inner wall and an outer wall spaced from said inner wall, each said outer wall being lower than each said inner wall.

21. A platform truck according to claim 16 further comprising a pocket in each said side wall assembly, said handle being received in each said pocket such that said handle may be selectively positioned in said generally upright position, in said position generally adjacent to said side wall assemblies, and in a generally outward position.

22. A platform truck transporting items comprising a base member having a top surface to receive items thereon, a handle carried by said base member, a plurality of caster assemblies, each said caster assembly including a stem, a frame swivelable on said stem, and a wheel rotatably carried by said frame, and a caster support system formed on the bottom of said base member, said caster support system permitting selected of said caster assemblies to be selectively mounted to said base member to prevent swivelable movement and thereby allow only unidirectional movement or to permit fully swivelable movement of said selected of said caster assemblies, said caster support system including a socket to receive said stem and a caster restraint positioned adjacent to said socket, said caster restraint engaging said frame to prevent swivelable movement of said frame.

23. A platform truck according to claim 22 further comprising side wall assemblies extending downwardly from said top surface, a pocket in each said side wall assembly, said handle being received in each said pocket such that said handle may be selectively positioned in a generally upright position, a generally outward position, and a generally horizontal position.

24. A platform truck according to claim 23 further comprising opposed depressions in said side wall assemblies so that the platform truck may be carried by grasping said handle at the location of at least one said depressions when said handle is in said generally horizontal position.

25. A platform truck according to claim 22 wherein said caster support system further includes a second socket, said stem being positionable in said second socket to permit fully swivelable movement of said caster assembly.

26. A platform truck for transporting items comprising a base member having a top surface to receive items thereon and generally vertical opposed side wall assemblies extending downwardly from said top surface; opposed depressions in said side wall assemblies; a handle assembly pivotally carried by said base member; said handle assembly being positionable in a generally upright position for pushing said base member, a generally outward position for pulling said base member, and a generally horizontal position adjacent to said side wall assemblies and generally flush with said top surface of said base member so that the platform truck may be carried by grasping said handle assembly at the location of at least one of said depressions; a plurality of caster assemblies; and a caster support system formed on the bottom of said base member, said caster support system permitting selected of said caster assemblies to be selectively mounted to said base member for unidirectional movement or fully swivelable movement of said selected of said caster assemblies.

* * * * *